United States Patent Office 3,073,867
Patented Jan. 15, 1963

3,073,867
PROCESS FOR THE MANUFACTURE OF ACETOPHENONE
Robert D. Offenhauer, Deptford Township, Gloucester County, and Anthony J. Silvestri, Glassboro, N.J.
No Drawing. Filed Jan. 11, 1960, Ser. No. 1,435
3 Claims. (Cl. 260—592)

This invention relates to the oxidation of hydrocarbons. It is more particularly concerned with the catalytic oxidation of alkylbenzene hydrocarbons to acetophenone in the presence of a novel catalyst.

It has been proposed to oxidize alkylaromatic hydrocarbons in the presence of heavy metal catalyst, in the form of their oxides or carboxylic acid salts. These processes have produced mixtures containing alcohols, ketones and, quite often, carboxylic acids. Relatively few processes have been proposed to produce acetophenone by the oxidation of alkyl-benzenes. It has now been found that the oxidation of alkyl-benzenes to acetophenone can be effected in good yield. It has been discovered that such oxidation can be effected readily in the presence of a novel catalyst therefor.

Accordingly, it is a broad object of this invention to provide a process for the manufacture of acetophenone. Another object is to provide an oxidative process for the manufacture of acetophenone. A specific object is to provide a process for the manufacture of acetophenone by the catalytic oxidation of alkylbenzenes. Other objects and advantages of this invention will become apparent to those skilled in the art, from the following detailed description.

The present invention provides a process for the manufacture of acetophenone which comprises reacting, in the liquid phase, an alkylbenzene having the formula

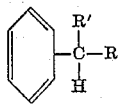

wherein R is a lower alkyl radical and R' is hydrogen or methyl, with oxygen in the presence of between about 0.01 percent and about 5.0 percent iron octaphenylporphorazine catalyst, by weight of said alkylbenzene, for a period of time varying between about one-quarter hour and about 24 hours, and at a temperature varying between about 50° C. and about 250° C.

The alkylbenzene reactants that are oxidized to acetophenone in the process of this invention are the alkylbenzenes having at least one hydrogen atom on the carbon atom next to the ring, i.e. compounds having the formula

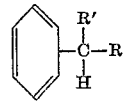

wherein R is a lower alkyl radical and R' is hydrogen or a methyl radical. Non-limiting examples of such hydrocarbons are ethylbenzene, propylbenzene, cumene, n-butylbenzene, and sec-butylbenzene. The alkylbenzene reactant used can be a pure hydrocarbon or it can be a technical grade material. Likewise, mixtures of two or more alkylbenzene reactants can be used. Hydrocarbon fractions such as petroleum cuts, that are rich in one or more alkylbenzene reactant are contemplated herein. The alkylbenzene reactants can be from any of the numerous sources known to the art, including petroleum cuts, alkylation of benzene, etc.

The catalyst used herein is iron octaphenyl-porphorazine, which has the formula:

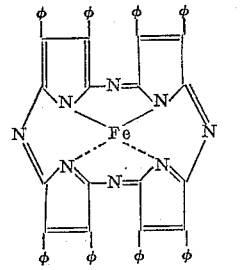

Iron octaphenylporphorazine

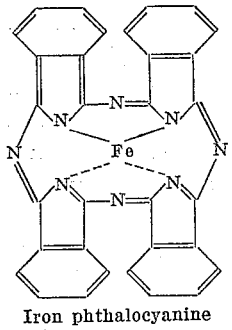

Iron phthalocyanine

This compound can be prepared by heating diphenyl-maleonitrile with iron powder, in accordance with the method of Cook and Linstead, J. Chem. Soc., 1937, 929. Small amounts of this catalyst are required herein. Generally, the amount of catalyst used will be between about 0.1 percent and about one percent, by weight of the alkylbenzene reactant.

The oxygen reactant can be relatively pure oxygen or it can be a gaseous mixture containing oxygen, such as air. The amount of oxygen used is conveniently measured by its flow rate, which will be between about 0.01 cubic foot per hour and about 5 cubic feet per hour, preferably between about 0.1 and about one cubic foot per hour per mole of substrate.

The oxidation reaction can be carried out, in the liquid phase, at temperatures varying between about 50° C. and about 250° C., preferably between about 100° C. and about 150° C. The time of reaction will vary dependent upon temperature, catalyst concentration, and the oxygen flow rate. Likewise, the efficiency of the liquid-gas contact is an influencing factor. Generally, the process will be carried out for a period of time varying between about one-quarter hour and 24 hours. In preferred practice, the contact time will be between about one-half hour and about 5 hours.

The following specific examples demonstrate the process of this invention and the effectiveness thereof. It is to be strictly understood that this invention is not to be limited to the specific reactants or to the operations and manipulations involved therein. Other reactants and conditions as described hereinbefore are utilizable, as those skilled in the art will readily appreciate.

EXAMPLE 1

Oxygen was bubbled through ethylbenzene at 135° C., at a rate of 0.25 cu.ft./hr. and for 5 hours. At the end of the first, the third, and the fifth hours, samples of the reaction mixture were taken and subjected to infra-red analysis, to determine the amount of conversion to acetophenone. Pertinent data are set forth in Table I.

*Example 2*

A mixture of ethylbenzene and 0.5 percent iron octaphenylporphorazine, based upon weight of ethylbenzene, was placed in a reaction vessel. As in Example 1, oxygen was bubbled through the mixture at 135° C., at a rate of 0.25 cu.ft./hr. and for 5 hours. The initial green color of the reaction mixture changed to brown after the first several minutes of reaction. Samples for infra-red analysis for conversion to acetophenone were taken, respectively, after 1, 3, and 5 hours reaction time. The pertinent data are set forth in Table I.

*Example 3*

A run was made, as described in Example 2, except that 1.0 percent iron octaphenylporphorazine, by weight, was used. Pertinent data are set forth in Table I.

TABLE I

| Time, hrs | 1 | 3 | 5 |
|---|---|---|---|
| Example 1 (no catalyst) Yield Acetophenone, Wt. Percent | 0 | 0 | 0 |
| Example 2 (0.5% catalyst) Yield Acetophenone, Wt. Percent | 12 | 37 | 48 |
| Example 3 (1.0% catalyst) Yield Acetophenone, Wt. Percent | 21 | 43 | 55 |

From a comparison of the data of Table I, it will be apparent that the process of this invention affords good yields of acetophenone. Increased catalyst concentrations gives increased yields. Yield could also be increased by longer reaction times or by increased temperature. In any event, the unreacted ethylbenzene can be recovered by distillation and recycled to extinction.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A process for the manufacture of acetophenone which comprises reacting, in the liquid phase, an alkylbenzene having the formula:

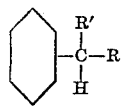

wherein R is a lower alkyl radical and R' is selected from the group consisting of hydrogen and methyl, with oxygen, in the presence of between about 0.01 percent and about 5 percent iron octaphenylporphorazine catalyst, by weight of said alkylbenzene, for a period of time varying between about one-quarter hour and about 24 hours, and at a temperature varying between about 50° C. and about 250° C.

2. A process for the manufacture of acetophenone which comprises reacting, in the liquid phase, an alkylbenzene having the formula:

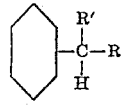

wherein R is a lower alkyl radical and R' is selected from the group consisting of hydrogen and methyl, with oxygen, in the presence of between about 0.1 percent and about one percent iron octaphenylporphorazine catalyst, by weight of said alkylbenzene, for a period of time varying between about one-half hour and about 5 hours, and at a temperature varying between about 100° C. and about 150° C.

3. A process for the manufacture of acetophenone which comprises reacting, in the liquid phase, ethylbenzene with oxygen, in the presence of between about 0.1 percent and about one percent iron octaphenylporphorazine catalyst, by weight of said ethylbenzene, for a period of time varying between about one-half hour and about 5 hours, and at a temperature varying between about 100° C. and about 150° C.

References Cited in the file of this patent

UNITED STATES PATENTS 1,813,606  Binapfl et al. _____ July 7, 1931

FOREIGN PATENTS 801,387  Great Britain _____ Sept. 10, 1958

UNITED STATES PATENT OFFICE
CERTIFICATE OF CORRECTION

Patent No. 3,073,867　　　　　　　　　　　　January 15, 1963

Robert D. Offenhauer et al.

It is hereby certified that error appears in the above numbered patent requiring correction and that the said Letters Patent should read as corrected below.

In the grant, lines 1 to 3, for "Robert D. Offenhauer, of Deptford Township, Gloucester County, and Anthony J. Silvestri, of Glassboro, New Jersey," read -- Robert D. Offenhauer, of Deptford Township, Gloucester County, and Anthony J. Silvestri, of Glassboro, New Jersey, assignors to Socony Mobil Oil Company, Inc., a corporation of New York, --; line 12, for "Robert D. Offenhauer and Anthony J. Silvestri, their heirs" read -- Socony Mobil Oil Company, Inc., its successors --; in the heading to the printed specification, lines 4 and 5, for "Robert D. Offenhauer, Deptford Township, Gloucester County, and Anthony J. Silvestri, Glassboro, N. J." read -- Robert D. Offenhauer, Deptford Township, Gloucester County, and Anthony J. Silvestri, Glassboro, N. J., assignors to Socony Mobil Oil Company, Inc., a corporation of New York --.

Signed and sealed this 20th day of August 1963.

(SEAL)
Attest:
ERNEST W. SWIDER
Attesting Officer

DAVID L. LADD
Commissioner of Patents